United States Patent

Pamer

[15] 3,694,990
[45] Oct. 3, 1972

[54] WELDED BOX-TYPE STRUCTURAL MEMBER

[72] Inventor: Karl A. Pamer, Chagrin Falls, Ohio

[73] Assignee: McNeil Corporation, Akron, Ohio

[22] Filed: June 9, 1970

[21] Appl. No.: 44,773

[52] U.S. Cl.......................52/731, 29/155 R, 29/463
[51] Int. Cl................................................E04c 3/30
[58] Field of Search..............52/731, 732, 730, 574; 29/155 R, 155 C, 463

[56] References Cited

UNITED STATES PATENTS

| | | | |
|---|---|---|---|
| 484,026 | 10/1892 | Larimer | 52/731 |
| 1,740,053 | 12/1929 | Wehr | 52/731 |
| 2,731,824 | 1/1956 | Hadley | 52/731 |
| 3,190,410 | 6/1965 | Mölstad | 52/731 |
| 3,396,989 | 8/1968 | Kolbe | 52/731 |
| 3,490,190 | 1/1970 | See | 52/730 |

FOREIGN PATENTS OR APPLICATIONS

| 693,705 | 8/1940 | Germany | 52/731 |
|---|---|---|---|

Primary Examiner—Henry C. Sutherland
Attorney—Watts, Hoffmann, Fisher & Heinke

[57] ABSTRACT

A welded box article, such as, a girder, column, beam, etc., comprising top, bottom, web and diaphragm or reinforcing plates connected by "flat" welds, that is, by welds formed on the top side of a flat or horizontally positioned member and a method of constructing such an article by welding diaphragm plates to top and bottom plates with the top plate inverted and both plates flat; subsequently positioning the subassemblies thus formed on separate flat web plates with one edge of the diaphragm plates resting on the web plates and welding the diaphragm plates to the web plates to form girder sections; thereafter assembling the two sections with two of the plates extending vertically and welding the adjoining flat edges; rotating the assembly thus formed 180° about its longitudinal axis, and welding the adjoining flat edges. In an alternative method a different web plate is first welded to each of the flat top and bottom plates.

7 Claims, 16 Drawing Figures

INVENTOR.
KARL A. PAMER

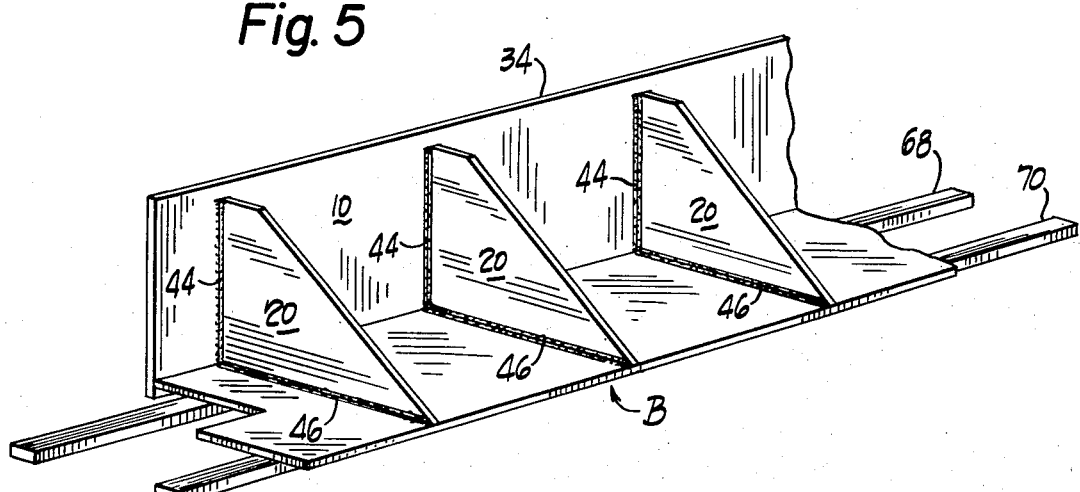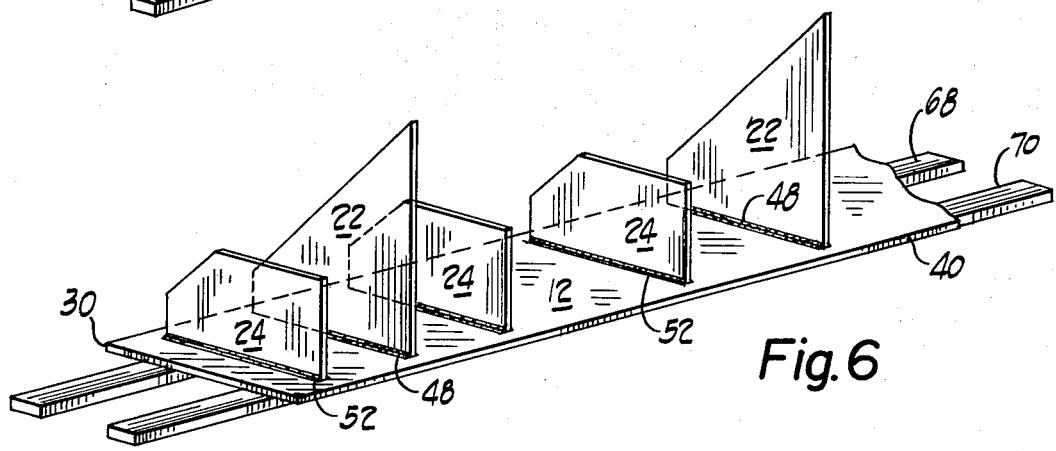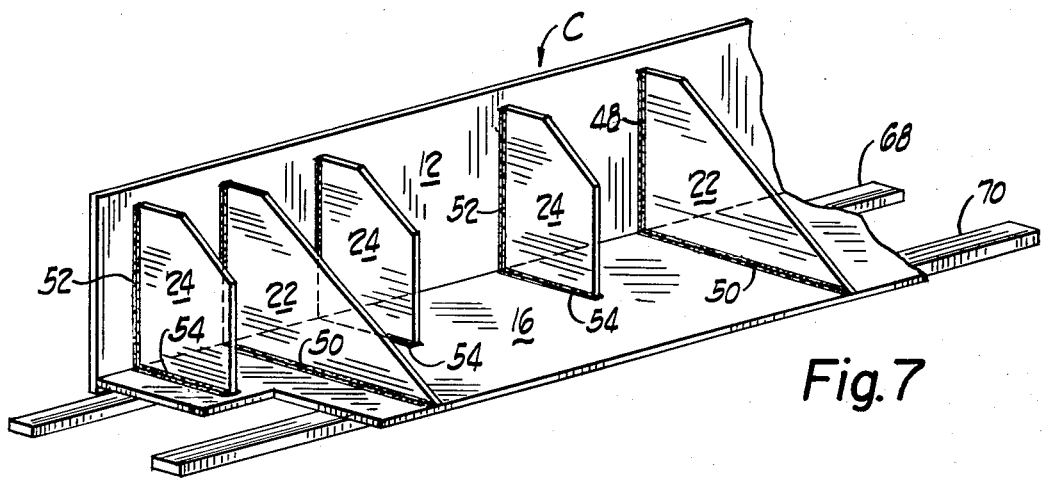

INVENTOR.
KARL A. PAMER
BY Watts, Hoffmann,
Fisher & Heinke
ATTORNEYS.

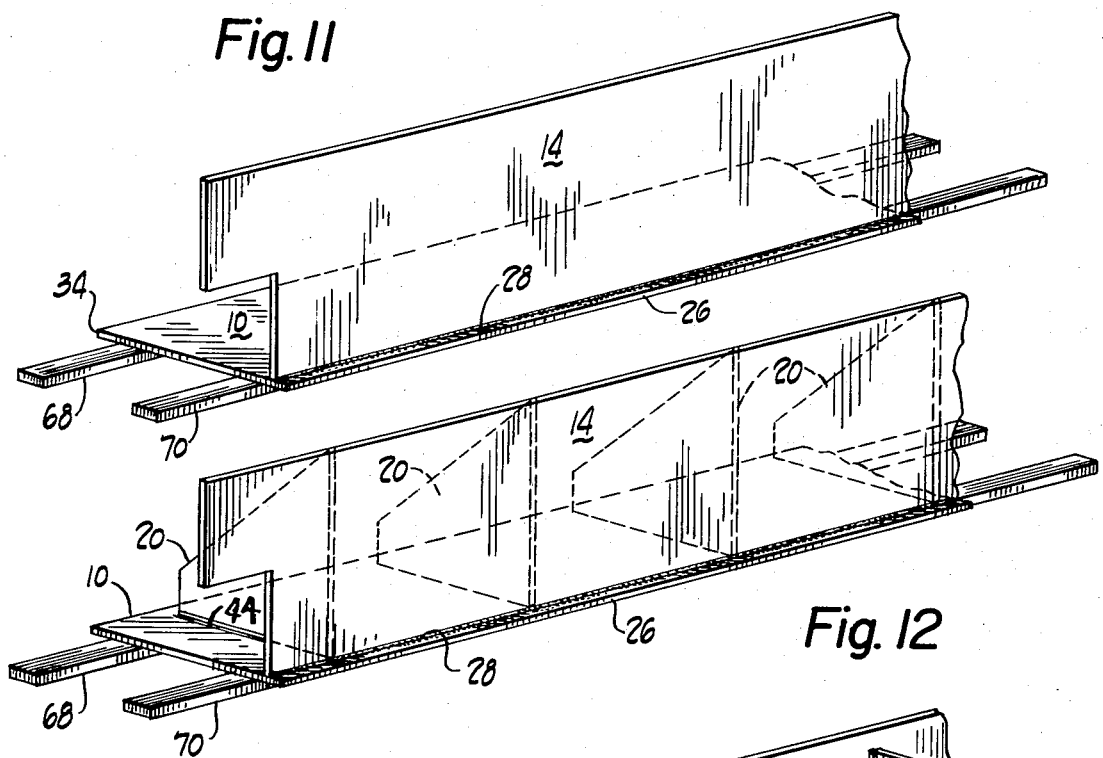
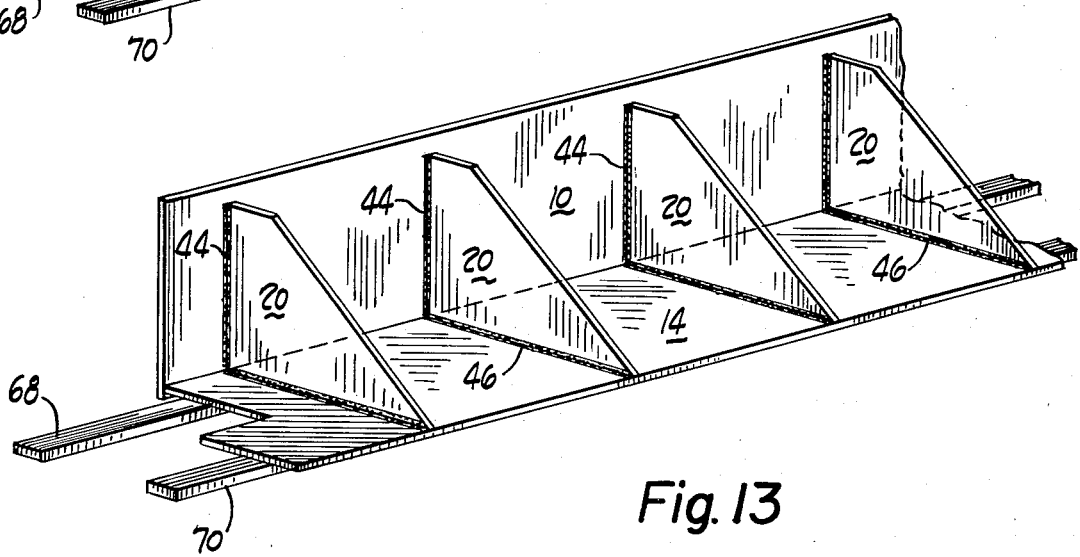

WELDED BOX-TYPE STRUCTURAL MEMBER

FIELD OF THE INVENTION

The invention relates to welded box-type structural articles and to method of their construction.

PRIOR ART

As the name implies, box-type structural articles comprise side members secured together by some suitable means, such as, rivets, bolts and/or welds, etc. Where such articles include internal diaphragm or reinforcing members they were made by hand welding and many of the welds where required had to be made within confined spaces in the article or subassemblies thereof exposing the welders to objectionable fumes.

SUMMARY OF INVENTION

The present invention provides a welded box-type structural article comprising side plates and diaphragm or reinforcing plates connected by "flat" welds and a method of producing such an article manually or by automatic welding equipment where none of the welding is performed in a closed or confined area thus avoiding, if the welding is done manually, the exposure of welders to objectionable fumes produced by the welding operation.

The present invention provides a welded box-type structural member, for example, a box girder, beam, column, etc., having internal diaphragms or reinforcing members constructed exclusively of flat welds and a method of producing such an article by manual welding or automatic welding equipment and without the necessity of doing welding in a confined place.

DESCRIPTION OF DRAWINGS

FIG. 5 is a fragmentary perspective view illustrating the preferred manner of welding the diaphragm or reinforcing plates shown in FIG. 4 to the near side or web plate of the girder, as viewed in FIG. 1;

FIG. 6 is a fragmentary perspective view illustrating the preferred manner of welding spaced diaphragm or reinforcing plates to the top side of the girder shown in FIGS. 1 to 3;

FIG. 7 is a fragmentary perspective view illustrating the preferred manner of welding the diaphragm or reinforcing plates shown in FIG. 6 to the far side or web plate of the girder, as viewed in FIG. 1;

FIG. 11 is a fragmentary perspective view illustrating an alternative manner of welding the bottom side plate of the box girder shown in FIGS. 1 to 3 to the near web plate;

FIG. 12 is a view similar to FIG. 11 illustrating the welding of the diaphragm or reinforcing plates to the bottom side plate;

FIG. 13 is a fragmentary perspective view of the subassembly shown in FIG. 12 illustrating the welding of the diaphragm or reinforcing plates welded to the web plate;

PREFERRED EMBODIMENT OF INVENTION

While the present invention may be embodied in and employed to construct various articles, such as, box girders, box beams, box columns, highway bridge girders, etc., it is herein illustrated and described as it relates to a box girder for a bridge-type overhead traveling crane.

Figure 1:
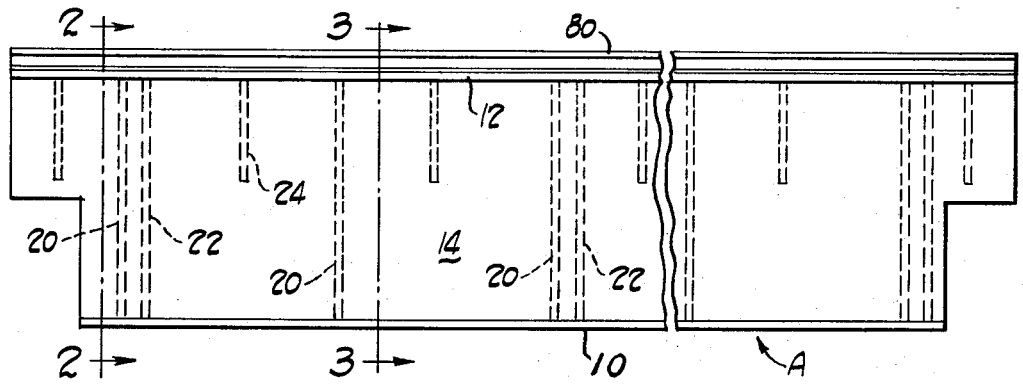
FIG. 1 is a fragmentary side elevational view of a crane box girder embodying the present invention and having a rail for supporting a movable trolley on its top side.

The girder shown in the drawings and designated generally by the reference character A comprises bottom and top plates 10, 12, respectively, and near and far side or web plates 14, 16, respectively, as viewed in FIG. 1, and a plurality of diaphragm or reinforcing plates 20, 22, 24.

The lower edge of the near web plate 14 abuts the top side of the bottom plate 10 a short distance inwardly of the front edge 26 thereof and the two plates are welded together by a continuous longitudinal flat weld 28 extending along the external side of the lower edge of the plate 14. The upper edge of the plate 14 abuts the underside of the top plate 12 slightly inwardly of the front edge 30 thereof and the two plates are welded together by a continuous longitudinal flat weld 32 along the external side of the upper edge of the plate 14. The lower edge of the far web plate 16 abuts the top side of the bottom plate 10 slightly inwardly from the rear edge 34 thereof and is welded thereto by a continuous longitudinal flat weld 36 extending along the lower edge of the plate 16. The upper edge of the plate 16 abuts the underside of the top plate 12 slightly inwardly from the rear edge 40 thereof and is welded thereto by a continuous longitudinal flat weld 42 along the upper edge of the plate 16.

The diaphragm or reinforcing plates 20, 22, 24 are spaced along the length of the girder and are welded to the plates 10, 14 and 12, 16, respectively. The reinforcing plates shown are of a preferred shape and are spaced along the length of the girder in a manner hereinafter referred to. It is to be understood, however, that reinforcing plates of any suitable shape and spaced any suitable distance along the girder may be employed.

The reinforcing plates 20 abut the bottom plate 10 and the web plates 14, 16 and are welded to the bottom plate 10 and the web plate 14 by transverse flat welds 44, 46, respectively, along either or both sides of the reinforcing plates. The reinforcing plates 22 abut the top plate 12 and the web plates 14, 16 and are welded to the plates 12 and 16 by transverse flat welds 48, 50, respectively, along either or both sides of the reinforcing plates. The reinforcing plates, 20, 22 are similar to one another. The reinforcing plates 24 are similar to the reinforcing plates 22 except that they have their lower ends removed or cut away. The reinforcing plates 24 abut the top plate 12 and the web plates 14, 16 and are welded to the plates 12 and 16 by transverse flat welds 52, 54, respectively. The welds 44, 46, 48, 50, 52 and 54 are preferably continuous and all of the welds are so-called "down" or "flat" welds, that is, welds made from above, as distinguished from welds made vertically or overhead, commonly called "vertical" or "overhead" welds.

Figure 2:
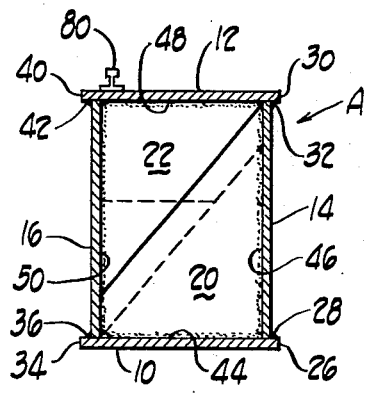
FIG. 2 is a sectional view approximately on line 2—2 of FIG. 1.
Figure 3:
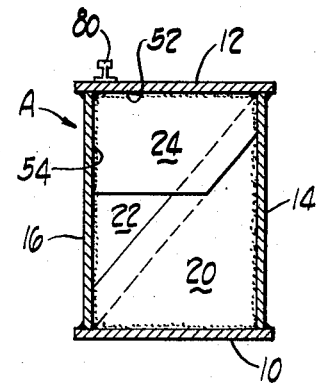
FIG. 3 is a sectional view approximately on the line 3—3 of FIG. 1.
Figure 4:
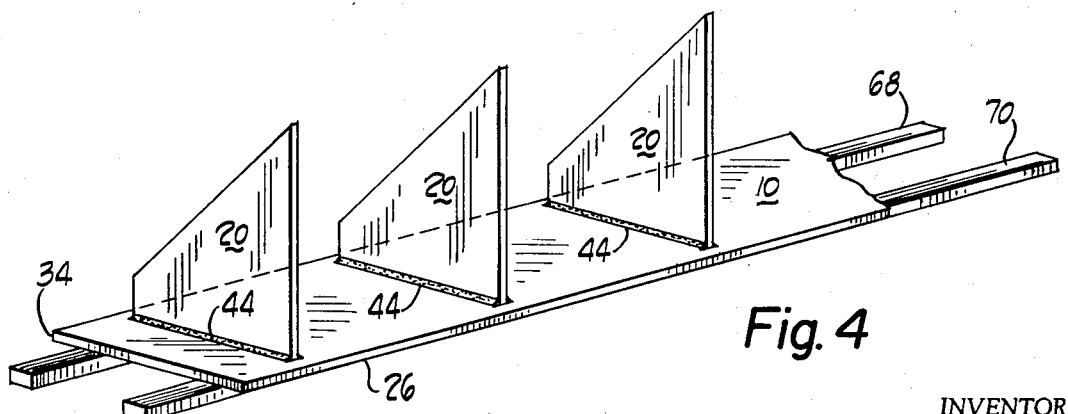
FIG. 4 is a fragmentary perspective view illustrating the preferred manner of welding the spaced diaphragm or reinforcing plates to the bottom side plate of the girder shown in FIGS. 1 to 3.

The preferred manner of constructing the girder illustrated in FIGS. 1 to 3 of the drawings is illustrated in FIGS. 4 to 10 of the drawings. In constructing the one girder section B comprising the bottom plate 10, the web plate 14 and the reinforcing plates 20, the bottom plate 10 is positioned horizontally, as illustrated in FIG. 4, on a suitable support, such as, members 68, 70, located underneath the plate, spaced inwardly from the sides 26, 34 of the plate 10. With the bottom plate 10 so supported, the reinforcing plates 20 are placed on the bottom plate and welded at either or both of their sides to the bottom plate by making the flat welds 44 along the adjoining flat edges of the members. As previously mentioned, these welds are preferably continuous welds but can be intermittent or tack welds and can be made by automatic welding equipment. The reinforcing plates 20 can be welded to the bottom plate 10 either individually or a plurality thereof can be welded simultaneously.

After the flat welds 44 are made the subassembly thus formed is rotated about its length and positioned on the web plate 14, as illustrated in FIG. 5, which has been substituted for the plate 10 on the supports 68, 70 and the diaphragm or reinforcing plates 20 welded to the web plate 14 at one or both sides of the diaphragm or reinforcing plates by making the flat welds 46. Rather than supporting the web plate 14 on the supports 68, 70, it may be supported in any other suitable manner.

The second girder section C, comprising the top plates 12, the web plate 16 and the reinforcing or diaphragm plates 22, 24, is constructed in a manner similar to that in which the first girder section B is constructed. The construction of both sections B and C may be concurrent. The manner in which the section C is constructed is illustrated in FIGS. 6 and 7. The top plate 12 is positioned on the supports 68, 70 or similar supports with the plane of the plate horizontal and the reinforcing or diaphragm members 22, 24 welded thereto by making the flat welds 48, 52 at one or both sides of the reinforcing plates 22, 24, respectively. The subassembly thus formed is then rotated and placed on the web plate 16 which has been substituted for the top plate 12 on the supports 68, 70. Alternatively the web plate 16 may be otherwise supported as desired. The diaphragm or reinforcing plates 22, 24 are then welded to the web plate 16 along either or both sides by making the flat welds 50, 54.

Figure 8:
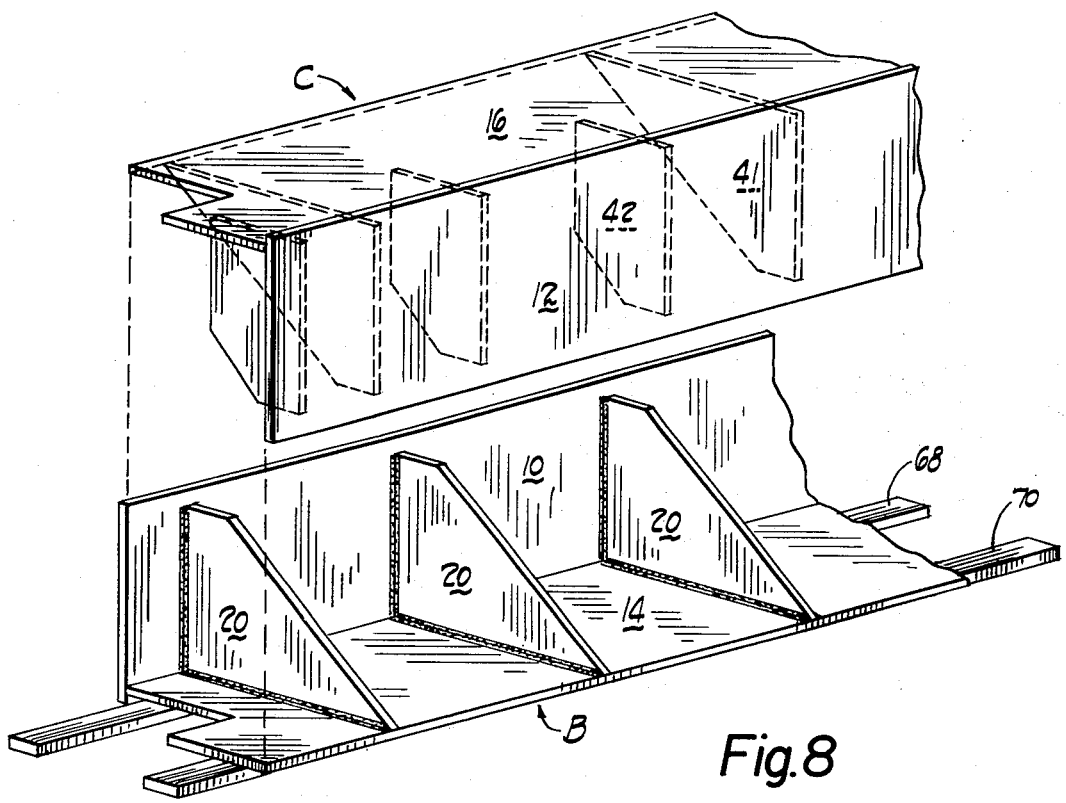
FIG. 8 is a fragmentary perspective view illustrating the manner of assembling together the girder sections shown in FIGS. 5 and 7.
Figure 9:
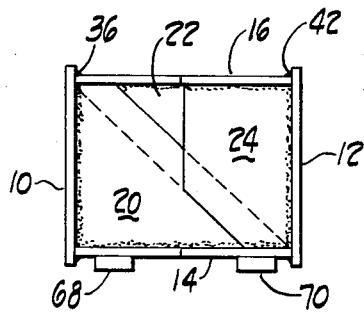
FIG. 9 is an end view of the assembled girder sections shown in FIG. 8 illustrating the preferred manner of welding the far side web plate to the top and bottom plates.

With the girder section B resting upon suitable supports, for example, the supports 68, 70, with the web plate 14 engaging the supports, that is, as shown in FIG. 5, the girder section C is inverted over the girder section B, as illustrated in FIG. 8, and positioned on the girder section B, as shown in FIG. 9. The web plate 16 is then welded to the bottom and top plates 10 and 12 by making the flat welds 36 and 42, respectively, along the adjacent unwelded longitudinally extending adjacent flat edge of the members. The assembly shown in FIG. 9 is thereafter rotated 180°, to the position illustrated in FIG. 10, and the web plate 14 welded to the bottom plate 10 and the top plate 12 by making the longitudinal flat welds 28 and 32, respectively. The girder is now of the construction shown in FIGS. 1 to 3, with the exception of the attachment of the rail 80 to the top plate 12 which may be accomplished in any suitable manner.

Figure 10:
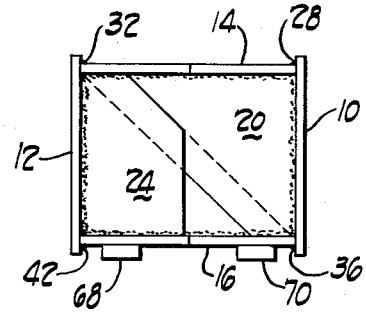
FIG. 10 is a view similar to FIG. 9 but showing the girder sections in position for welding the other web plate to the top and bottom plates.

The longitudinal welds 28, 32, 36 and 42, as just described, were made with the assembled girder sections B and C resting upon one or the other of the web members 14, 16, with the welds 36, 42 being made first. It is to be understood that either pair of welds may be made first and that instead of orienting the assembly as illustrated in FIGS. 9 and 10, the assembly could be oriented with either the bottom or top plate 10, 12 resting upon the supports and the longitudinal welds along opposite upper sides of the member resting upon the supports made, and the assembly thereafter rotated 180° for the making of the other two longitudinal welds. The assembled girder sections B, C, for example, could be supported with the bottom plate 10 resting upon the supports and the longitudinal flat welds 28, 36 made and the assembly thereafter supported on the top plate 12 and the longitudinal flat welds 32, 42 made. This is possible because either in the positions illustrated in FIGS. 9 and 10 or the alternative positions referred to above, at least a portion of the bottom and top members 10, 12 are located beyond the web members 13, 16.

FIGS. 11 to 16 show an alternative method of constructing the box girder shown in FIGS. 1 to 3. In accordance with the alternative method the bottom plate 10 is positioned, as illustrated in FIG. 11, on supports, such as the supports 68, 70, and the web plate 14 welded thereto by making the weld 28. The diaphragm or reinforcing plates 20 are then welded to the bottom plate 10 by making the welds 44 above either or both sides of the plates 20, as illustrated in FIG. 12. Thereafter the subassembly thus formed is rotated and placed upon the supports 68, 70, or other suitable supports, as illustrated in FIG. 13, with the web plate 14 resting upon the supports and the diaphragm or reinforcing plates 20 welded to the web plate 14 by making the welds 46 along one or both sides of the diaphragm plates. The assembly thus formed, constitutes section B of the girder.

Figure 14:
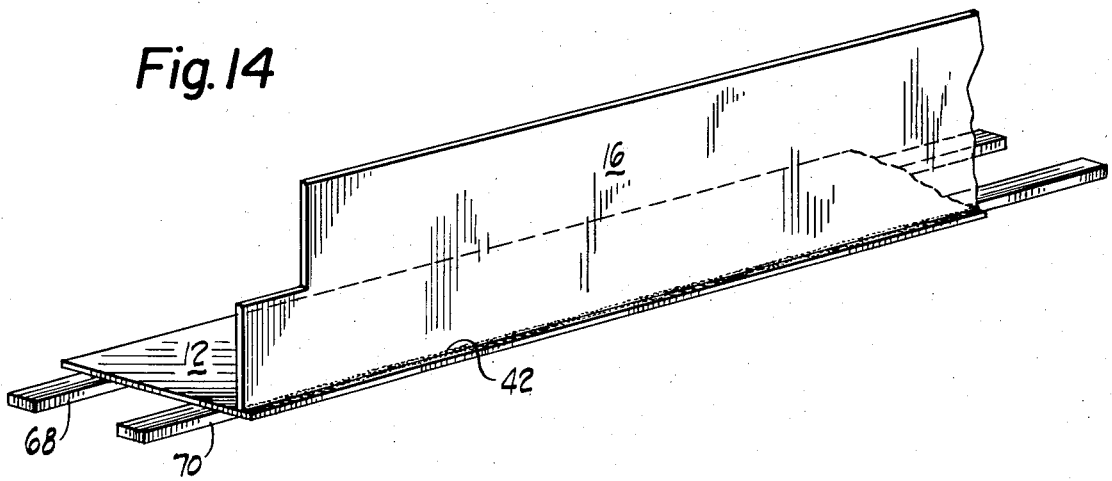
FIG. 14 is a fragmentary perspective view illustrating an alternative manner of welding the top side plate of the box girder shown in FIGS. 1 to 3 to the near web plate.
Figure 15:
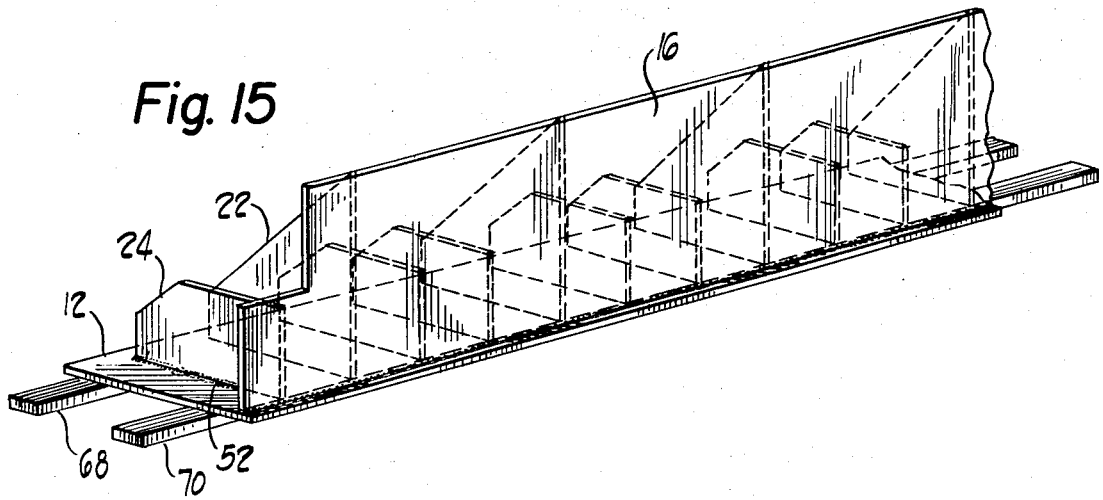
FIG. 15 is a view similar to FIG. 14 illustrating the welding of the diaphragm or reinforcing plates to the top plate.
Figure 16:
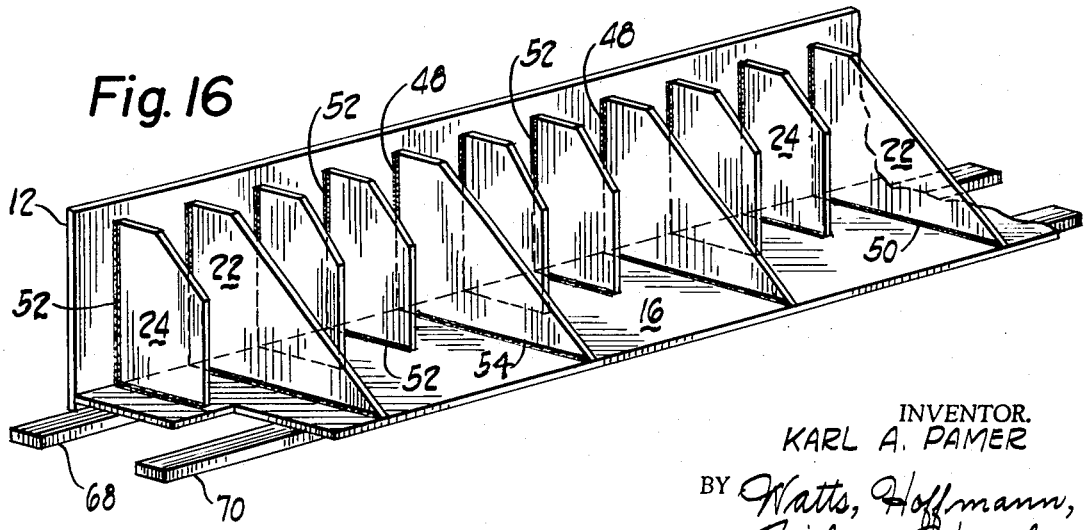
FIG. 16 is a fragmentary perspective view of the subassembly shown in FIG. 15 illustrating the welding of the diaphragm or reinforcing plates welded to the web plate.

The section C of the girder is constructed by placing the top plate 12 in a horizontal position on suitable supports, such as, the supports 68, 70, and welding the web plate 16 thereto by making the weld 42, as illustrated in FIG. 14. Welds may be formed along either or both sides of the web plate 16. The diaphragm or reinforcing plates 22, 24 are then assembled with the top plate 12 and web plate 16, as illustrated in FIG. 15, and welded to the top plate 12 along one or both sides thereof by making the welds 48, 42, respectively. The subassembly thus produced is then rotated to the position illustrated in FIG. 16, and rested upon the supports 68, 70, or other suitable supports, with the web plate 16 resting upon the supports and the diaphragm or reinforcing plates 22, 24 welded to the web plate 16 along one or both sides by making the welds 50, 54. This completes girder section C.

The girder sections B and C are then assembled with one another in a manner generally similar to the manner in which they are assembled in the preferred embodiment. With the girder section B resting upon suitable supports, for example, the supports 68, 70, with the web plate 14 engaging the supports, that is, as illustrated in FIG. 13, the girder section C is inverted thereof and the web plate 16 welded to the bottom plate 10 by making the weld 36. The assembly is then rotated 180° and the web plate 14 welded to the top plate 12 by making the weld 32. This completes the construction of the girder as shown in FIGS. 1 to 3 with the exception of the attachment of the rail 70 to the top plate 12. As will be understood from the foregoing, the longitudinal flat welds could be performed with the girder sections B, C oriented in positions other than those specifically mentioned.

The arrangement of reinforcing plates including the reinforcing plates 22 are employed in the preferred embodiment of the invention because the girder shown is intended to be used as a crane girder and carry a rail 80 upon which a crane trolley is movably supported. If the structural member of the present invention is merely intended to serve as a beam, column, etc., different reinforcing members and/or different arrangements would be used depending upon the size, use, etc., of the structural member.

While the welds disclosed are made with one of the two members being welded together positioned absolutely flat and the welds being made extending horizontally, it is to be understood that absolutely flat and horizontal conditions are not necessary as so-called "flat" welds can be made at a considerable angle to the horizon.

The members being welded together may be, if desired, held in their desired assembled position by suitable fixtures and in most instances a plurality of welds made concurrently.

From the foregoing it will be apparent that the invention provides a welded structural member and method of producing the same, such as, a box girder, column, beam, etc., in which all of the welding is "flat" welding, can be performed exclusively by automatic welding equipment, and if produced manually, does not require any welding in confined places. The invention is not limited to the particular articles mentioned or to the particular construction or welding steps and their performance in the order mentioned, and it is the intention to thereby cover all adaptations and use of the invention within the practice of those skilled in the art to which it relates and within the scope of the appended claims.

Having thus described my invention, what I claim is:

1. A welded box girder for an overhead bridge-type crane comprising top and bottom plate-like members and spaced side or web plate-like members between said top and bottom members all connected together by flat welds to form a tubular-like assembly, a plurality of plate-like transverse reinforcing members wholly within and intermediate the ends of said assembly connected by flat welds to only said top member and to one of said side or web members, and a plurality of reinforcing members within and intermediate the ends of said assembly connected by flat welds to only said bottom member and the other of said side or web members, said reinforcing members being normal to the top and bottom members to which they are connected and in spaced parallel relation to each other.

2. A welded box-type girder for an overhead bridge-type crane comprising, a first plate-like side member, a second plate-like side member facing said first member and spaced therefrom, third and fourth plate-like side members interposed between said first and second members and welded thereto along the exterior adjoining parts of said members, a plurality of first spaced parallel plate-like transverse reinforcing members wholly within and normal to said side members and welded to only the side of said first member facing said second member and the side of said third member facing said fourth member, and a plurality of second spaced parallel plate-like transverse reinforcing members wholly within and normal to said side members and welded to only the side of said second member facing said first member and the side of said fourth member facing said third member.

3. A welded box girder for an overhead bridge type crane as claimed in claim 2 in which said welds are flat welds.

4. A method of producing a welded box-type girder for an overhead bridge-type crane comprising at least four plate-like side members and a plurality of plate-like transverse reinforcing members wholly within and normal to said members comprising, flat welding first side edges of a plurality of first plate-like reinforcing members to the upper side of and normal to a first side member at spaced locations, flat welding first side edges of a plurality of second plate-like reinforcing members to the upper side of and normal to a second side member at locations that space the second reinforcing members from each other, rotating said side members to position second side edges of said reinforcing members connected thereto generally horizontal with said second side edges of said second reinforcing members welded to said first side member adjacent the upper side of a third member and said second sides of said reinforcing members welded to said second side member adjacent to an upper side of a fourth side member; flat welding said reinforcing members to said third and fourth side members adjacent thereto, assembling the two articles thus produced with said first and second side members opposite one another, said third and fourth side members opposite one another and two of said side members generally horizontal, flat welding upwardly facing unwelded adjacent exterior edges of said articles together, rotating said assembly to position other unwelded adjacent exterior edges upwardly, flat welding the then upwardly facing unwelded adjacent exterior edges of said articles together, and leaving said first reinforcing members unwelded to the second and fourth side members and the second reinforcing members unwelded to the first and third side members.

5. A method of producing a welded box-type girder for an overhead bridge-type crane comprising at least four plate-like side members and a plurality of interior reinforcing members normal thereto comprising, flat welding a plurality of reinforcing members to the upper side of and normal to a first side member at spaced locations, flat welding a plurality of reinforcing members to the upper side of and normal to a second side member at locations that space the second reinforcing members from each other and from the first reinforcing members so that the reinforcing members avoid interengagement upon assembly, rotating said side members to position second side edges of said reinforcing members connected thereto generally horizontal with said second edges of said first reinforcing members welded to said first side member adjacent the upper side of a third side member and said second side edges of said second reinforcing members welded to said second side member adjacent to an upper side of a fourth side member; flat welding said reinforcing members to said third and fourth side members adjacent thereto; assembling the two articles thus produced with said first and second side members opposite one another and said third and fourth side members opposite one another with at least portions of one of said side members located to the outer side of another side member, with the reinforcing members of the two articles non-interengaged and with two of said side members generally horizontal, flat welding upwardly facing unwelded adjacent exterior edges of said articles together, rotating said assembly to position other unwelded adjacent exterior edges facing upwardly, flat welding the then upwardly facing unwelded adjacent exterior edges of said articles together, and leaving said first reinforcing members unwelded to the second and fourth side members and the second reinforcing members unwelded to the first and third side members.

6. A method of producing a welded box-type girder for an overhead bridge-type crane comprising top and bottom plate-like members, spaced side or web plate-like members between said top and bottom members, and a plurality of plate-like transverse reinforcing members wholly within and normal to said top, bottom and side or web members comprising, flat welding first side edges of a plurality of first reinforcing members of less width than that of the top member at spaced locations to the upper side of and normal to the top member inverted, flat welding first side edges of a plurality of second reinforcing members of less width than that of the bottom member to the upper side of and normal to the bottom member at locations that space the second reinforcing members from each other and from the first reinforcing members so that the reinforcing members avoid interengagement upon assembly, rotating said top and bottom members to position second side edges of said reinforcing members connected thereto generally horizontal with said second side edges of said reinforcing members welded to said top member adjacent the upper side of one of said side or web members and said second side edges of said reinforcing members welded to said bottom member adjacent to an upper side of the other of said side or web members, flat welding said second side edges of said reinforcing members to said side or web members adjacent thereto; assembling the two articles thus produced with said top and bottom members opposite one another, said side or web members opposite one another with at least portions of the top and bottom members located to the outer side of the side or web members, with the reinforcing members of the two articles non-interengaged and with two of said members generally horizontal, flat welding the upwardly facing unwelded adjacent exterior edges of said members together, rotating said assembly to position other unwelded adjacent exterior edges upwardly; and flat welding the then upwardly facing unwelded adjacent exterior edges of said members together, leaving the reinforcing members welded to only a top or bottom member and one adjacent side member.

7. A method of producing a welded box-type girder for an overhead bridge-type crane comprising top and bottom plate-like members, spaced web plate-like members between said top and bottom members, and a plurality of plate-like reinforcing members wholly within and normal to said top, bottom and web members connected by flat welds to only two of said members, comprising, flat welding a first side edge of a first web member to the upper side of the top member inverted, flat welding first side edges of a plurality of first plate-like reinforcing members to the upper side of and normal to one of said top and said first web members at spaced locations, rotating the resulting assembly to position second side edges of said first reinforcing members generally horizontal, flat welding said second side edges of said first reinforcing members to the other of and normal to said top and said first web members, flat welding a first side edge of a second web member to the upper side of the bottom member, flat welding first side edges of a plurality of second plate-like reinforcing members to the upper side of and normal to one of said bottom or second web members at spaced locations, rotating the resulting assembly to position second side edges of said second reinforcing members generally horizontal, flat welding said second side edges of said second reinforcing members to the other of and normal to said bottom and said second web members, positioning the two assemblies with said top and bottom members opposite one another and said web members opposite one another and said web members generally horizontal with the reinforcing members of each assembly non-interengaged, flat welding the upwardly facing unwelded adjacent external edges of said members together, rotating said assembly to position other unwelded adjacent external edges upwardly, and welding the then upwardly facing unwelded adjacent external edges of said members together, leaving the first reinforcing members unwelded to the bottom and second web members and the second reinforcing members unwelded to the top and first web members.

* * * * *